UNITED STATES PATENT OFFICE.

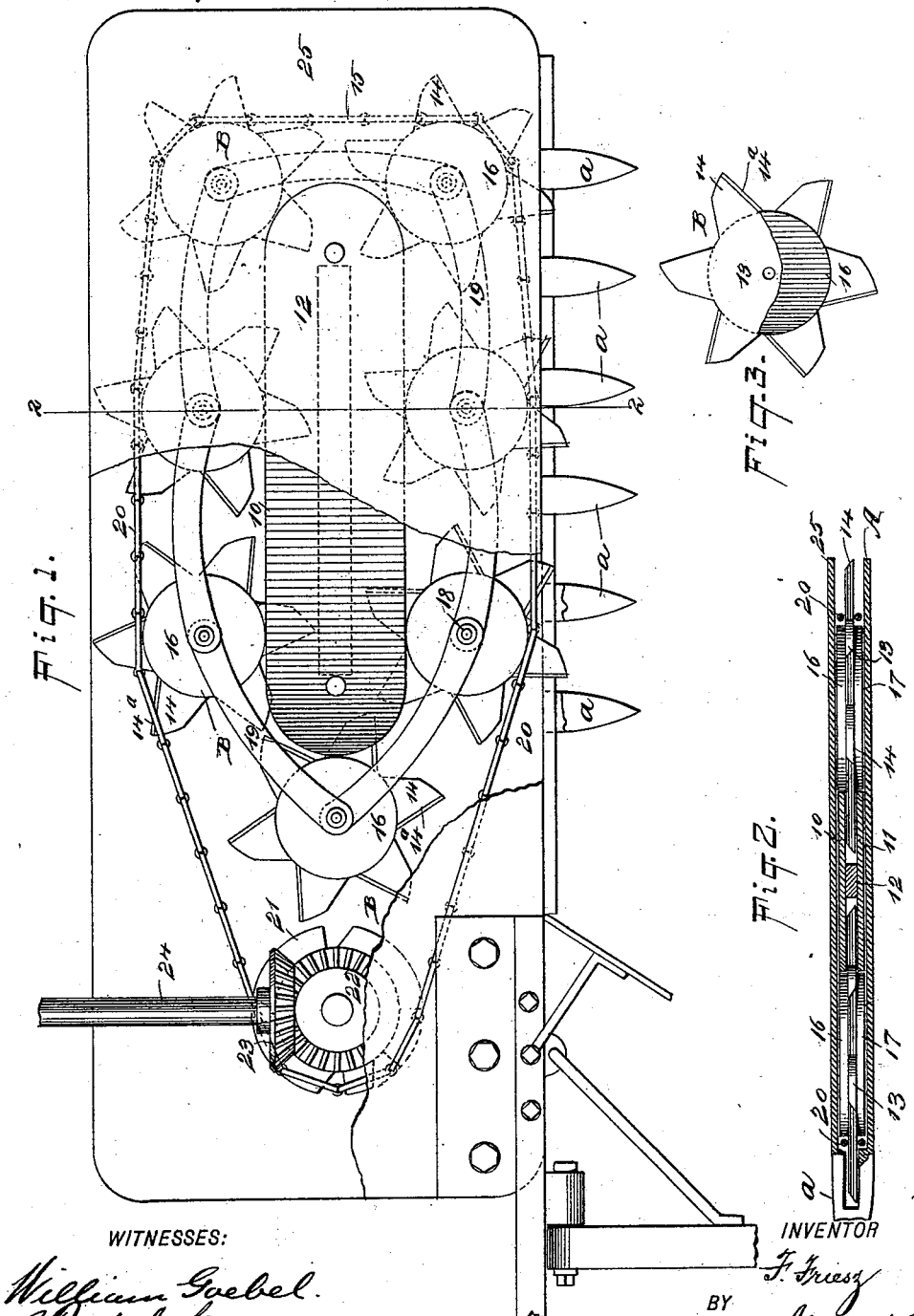

FREDERICK FRIESZ, OF SHENANDOAH, IOWA.

KNIFE OR CUTTER FOR HARVESTERS, REAPERS, OR LIKE MACHINES.

SPECIFICATION forming part of Letters Patent No. 536,464, dated March 26, 1895.

Application filed June 11, 1894. Serial No. 514,202. (No model.)

*To all whom it may concern:*

Be it known that I, FREDERICK FRIESZ, of Shenandoah, in the county of Page and State of Iowa, have invented a new and useful Improvement in Knives or Cutters for Harvesters, Reapers, or Like Machines, of which the following is a full, clear, and exact description.

My invention relates to knives or cutters for harvesters, reapers or like machines, and it has for its object to so construct the cutters or knives that they will be of stellated form, and will rotate individually upon their own axis, and collectively around a guide of predetermined construction, the cutters presenting themselves successively in position for cutting, and they are operated through the medium of an endless chain or its equivalent, whereby the cutters in operation clear themselves from grass or grain cut, thereby preventing clogging.

A further object of the invention is to provide cutters or knives for harvesters or reapers, which will operate with the least possible amount of friction, and will require but a minimum amount of power.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the knife or cutter platform of a harvester or reaper, a portion of the upper covering being broken away, illustrating the application of the improved cutters or knives. Fig. 2 is a transverse section, taken transversely on the line 2—2 of Fig. 1; and Fig. 3 is a plan view of one of the cutters, a part thereof being broken away.

In carrying out the invention the harvester platform A, having the guards $a$, which may be of any approved construction is provided at or near its center with two spaced elongated plates 10 and 11, held a predetermined distance apart through the medium of an elongated plate or bar 12. The plates 10 and 11 may be properly designated guide plates or guides, and the bar 12 a spacing bar. The spacing bar extends longitudinally between the guide plates 10 and 11, and the latter are rounded off at both ends, as clearly shown in Fig. 1. The cutters B are of stellated form, and usually comprise a body 13 of circular formation, and spurs or arms 14, usually six in number, projected horizontally from the peripheral portion of the body. These arms are of somewhat angular shape, one of their inclined edges $14^a$ being a cutting edge, and it is properly ground or beveled for that purpose. The cutting edge extends from the base to the outer end of the arm. The said arms are likewise adapted for use as sprockets, to be hereinafter set forth, and each cutter has attached to its circular body an upper and a lower correspondingly shaped plate or block, which are designated respectively as 16 and 17, and best shown in Fig. 2. The body portion of each cutter is provided with a pivot pin 18, around which it revolves, the pin being likewise passed through the top and bottom plates or blocks of the cutter, the latter being usually secured to the body of the cutter in any suitable or approved manner; and the blocks or plates 16 and 17 are of such thickness and are so located that they will travel in contact with the edges of the top and bottom guide plates 10 and 11, while the spurs or cutting members of the stellated cutters revolve in the space between the said guide plates.

The various cutters are pivotally connected through the medium of links 19, whereby the said cutters are arranged practically in an endless chain, and the cutters are given independent rotary movement upon their individual pivots, and collectively a rotary movement around the guides 10 and 11, through the medium of an endless chain belt 20, the links of which belt are of sufficient length to receive between them the outer arms 14 of the cutters, as shown best in Fig. 1. This chain belt is driven from a sprocket wheel 21, actuated through the medium of an attached gear 22, for example, the said gear being driven by meshing with a second gear 23, secured upon the driving shaft 24; and the entire series of cutting devices are covered by a top or cover plate 25, the edges of the cutters as they approach the front being adapted to extend beyond the outer edge of the cover plate, as is likewise shown in Fig. 1.

The arrangement of the cutters as above set forth enables them, when driven by the chain belt acting upon them in the nature of sprockets, to be driven, each cutter around its own axis, while the entire chain of cutters will be made to revolve around the guides 10 and 11. These successive cutters, and successive cutting surfaces of the cutters will be brought into action upon the grain or grass to be cut; and it is further evident that these cutting surfaces of the cutters will automatically clean themselves by reason of their constant shifting of position, owing to one cutting section after the other of the cutter being brought into engagement with the driving chain 20.

Cutters constructed as above set forth are exceedingly simple, durable and economic, and perform effective service.

Having thus described my invention, I claim as new and desire to secure by Letters Patent—

1. In cutters for harvesters, reapers or like machines, a guide adapted to be located upon the platform, a series of stellated cutters, each mounted upon an independent axis, links connecting the several axes of the cutters, the body portion of the cutters having bearing against the guides, and an endless driving chain acting upon the members of the cutters as upon sprockets of a wheel, whereby the cutters are independently revolved and collectively carried around the said guides, as and for the purpose set forth.

2. In harvesters, reapers and like machines, a platform, guides located upon the platform, spaced a predetermined distance apart and having rounded ends, stellated cutters having their body portions enlarged at top and bottom for engagement with the guides, the cutting members of the cutters being adapted to travel in the space between the guides, an independent axis provided for each cutter and upon which it is free to turn, and a connection between the axes of the several cutters, whereby the said cutters are arranged in a connected series, and a driving chain belt receiving the cutting members of the several cutters and imparting to them a collective rotary movement, as and for the purpose set forth.

FREDERICK FRIESZ.

Witnesses:
CHARLES P. COLOUEUS,
ALEXANDER W. MURPHY.